United States Patent [19]
Zinsmeyer

[11] Patent Number: 5,775,105
[45] Date of Patent: Jul. 7, 1998

[54] COMBINATION NOZZLE AND VALVE WITH VARIABLE GEOMETRY FOR INCREASED POWER RECOVERY FROM INTERNAL COMBUSTION ENGINE EXHAUST GAS

[76] Inventor: Herbert G. Zinsmeyer, 5911 Bullard Dr., Austin, Tex. 78757

[21] Appl. No.: 825,214

[22] Filed: Mar. 27, 1997

[51] Int. Cl.[6] .................................................. F02B 41/10
[52] U.S. Cl. ............................................................. 60/597
[58] Field of Search ............................ 60/597, 598, 605.1, 60/624

[56] References Cited

U.S. PATENT DOCUMENTS

| 2,624,171 | 1/1953 | Kollsman | 60/597 |
| 4,535,592 | 8/1985 | Zinsmeyer | 60/597 |

FOREIGN PATENT DOCUMENTS

| 1014786 | 8/1957 | Germany | 60/605.1 |
| 4-255527 | 9/1992 | Japan | 60/605.1 |
| 372556 | 5/1932 | United Kingdom | 60/597 |

Primary Examiner—Michael Koczo
Attorney, Agent, or Firm—Joseph F. Long

[57] ABSTRACT

This invention comprises a cam driven plug that opens and closes exhaust valve ports in an engine cylinder and while it moves to open forms an optimum variable geometry nozzle for the exhaust gasses exiting from the cylinder to impart maximum velocity energy to these exhaust gasses for delivery first at supersonic speed and then lower velocities as the cylinder pressure decays to drive a turbine that delivers power to the shaft of the internal combustion engine or other service loads.

4 Claims, 3 Drawing Sheets

COMBINATION NOZZLE AND VALVE WITH VARIABLE GEOMETRY FOR INCREASED POWER RECOVERY FROM INTERNAL COMBUSTION ENGINE EXHAUST GAS

BACKGROUND OF THE INVENTION

This invention relates to internal combustion engines and more particularly to advanced turbo compound engines and means to increase their efficiency in a more rigorous and practical way than has been done in the past.

U.S. Pat. No. 4,535,592 to Herbert G. Zinsmeyer, also the present inventor, dated Aug. 20, 1985 is the closest prior art that we are aware of. Both U.S. Pat. No. 4,535,592 and the present invention are intended to increase power output by increased recovery of energy from the cylinder gases being dumped to the exhaust. In both cases, energy recovered from the exhaust gas is used to drive a turbine that can be connected to add to the output shaft power of the engine, or used otherwise. The maximum power output from the turbine is achieved by delivering the exhaust gas at maximum possible velocity to the turbine blades throughout the cylinder blowdown at any selected design operating condition of the engine.

Consider, when gas under pressure escapes through a normal orifice or simple converging nozzle against a back pressure, decreasing the back pressure increases the velocity of the escaping gas, but only up to the point where the escape velocity equals the speed of sound (sonic velocity). But if a supersonic diffuser (having expanding flow area) is placed just downstream of the throat of the nozzle, the flow velocity can be increased to supersonic velocities if the exit pressure (back pressure) is reduced to below that which produces sonic flow at the throat. Such an arrangement is called a supersonic nozzle and is commonly used on rocket engines and steam turbines. The transition from the minimum area throat to this diffuser must be smooth, and the expansion rather gradual to prevent separation of the high speed stream from the wall of the nozzle.

The velocity (and Mach number) that can be produced at the exit (outlet end of the diffuser) depends on the overall ratio of absolute pressures, exit to upstream stagnation pressure. For any particular gas the Mach number (ratio of local velocity to its theoretical sonic velocity) is accurately defined in the study of gas dynamics as a function of this pressure ratio. Most importantly, for any such pressure ratio and the corresponding Mach number, the nozzle area ratio, exit to throat, is also well defined. Therefore, to actually achieve this ultimate supersonic exit velocity corresponding to the available pressure ratio, the nozzle must be constructed physically to have the associated area ratio. The mathematical relationships are as follows:

$$M_e = \left\{ \left(\frac{2}{k-1}\right)\left[\left(\frac{P_0}{P_e}\right)^{\frac{k-1}{k}} - 1\right] \right\}^{1/2}$$

$$\left(\frac{A_e}{A_t}\right) = \frac{1}{M_e}\left\{ \left(\frac{2}{k+1}\right)\left[1 + \left(\frac{k-1}{2}\right)M_e^2\right] \right\}^{\frac{k+1}{2(k-1)}}$$

For the case of typical exhaust gases, the value of the specific heat ratio, k, is 1.28, producing the following tabulated data, for reference.

| Pe/Po | Me | Ae/At | Diffuser Total Angle, ° | Valve Lift, in. |
|---|---|---|---|---|
| 0.549 | 1.00 | 1.000 | 0.000 | 0.331 |
| 0.432 | 1.20 | 1.032 | 0.524 | 0.282 |
| 0.330 | 1.40 | 1.124 | 1.504 | 0.211 |
| 0.247 | 1.60 | 1.276 | 1.517 | 0.096 |
| 0.212 | 1.70 | 1.376 | 0.571 | 0.0265 |
| 0.181 | 1.80 | 1.494 | 0.006 | 0.0002 |

Also tabulated above is the corresponding expansion angle and nozzle valve lift for a nozzle that has a diffuser length of about one inch, which is roughly the size needed for a 4 inch diameter piston as shown in the drawings, and a typical valve opening sequence and blowdown from about 85 psia to normal atmospheric pressure of 14.7 psia.

In the case of engines running at normal full load, the pressure remaining in the cylinders (versus atmospheric pressure) at the point where the exhaust valves must begin to open, is well above that which will generate sonic flow to the atmosphere. But in normal engines, exhausting through the usual poppet valve, all the energy remaining in the cylinder gases is wasted in a noisy discharge to the exhaust system, requiring sound absorbing mufflers. Sometimes, part of this energy is inefficiently recovered to drive a turbocharger that supercharges the engine to produce more power at the expense of additional fuel. Otherwise, the poppet valve produces a throttling process that dumps the available energy in a non-reversible process.

The cylinder pressure is normally in the range of 80 to 85 psia at the start of exhaust flow in normal spark ignition engines and is capable of generating nozzle exit flow Mach numbers of about 1.8, and requiring a nozzle exit to throat area ratio of about 1.5. As the piston continues downward and combustion gases escape through the gradually opening exhaust valve, the cylinder pressure decreases accordingly, until the pressure more or less equalizes to atmospheric pressure. During this blowdown, the ideal nozzle exit to throat area ratios varies accordingly, as was shown in the table above.

This invention provides a means to have the exhaust valve be shaped like a supersonic nozzle throughout its opening sequence, and whose shape is controlled to match that which is required in terms of exit to throat area ratio as the cylinder pressure decreases normally and predictably during its blowdown. With the nozzle-valve concept of this invention, the mechanical nozzle and its actuation can be easily designed to match the blowdown pressure decay throughout the blowdown for any particular engine, which is also predictable from the engine cylinder size, and operating conditions, the valve opening characteristics of its operating cain, and normal gas dynamics relationships. This programmed nozzle shape can be made correct throughout the blowdown sequence, which cannot be accomplished with die pivoting design concept disclosed in the original patented invention. This invention also includes the means for actuating the combination nozzle valve using conventional valve actuating mechanisms, and simple shaped runners to program the nozzle area ratios.

The present invention incorporates a sliding valve plug that blocks or opens the path of cylinder gases to the turbine. It includes shaped runners that change the angle of the plug as the plug moves position. This allows construction of a variable nozzle configuration as needed for any given engine application to maximize turbine output and engine efficiency. Normally this variable nozzle valve configuration comprises "opening" by increasing the area of the inlet, which is the nozzle throat, while at the same time, the exit

3 area is varying to maintain a ratio of exit area to throat area corresponding with that needed for reversible adiabatic (isentropic) expansion of the cylinder gases passing through the nozzle throughout the transient blowdown process. In so doing, it produces the maximum possible velocity of gas flow to the turbine blades throughout the blowdown, and thereby maximizes the turbine shaft output power.

SUMMARY OF THE INVENTION

The object of the invention is to provide a combination exhaust valve and variable geometry nozzle for each cylinder to allow design of an advanced turbo compound engine that operates with a higher fuel efficiency than present engines of this type.

The invention comprises a sliding valve plug, cam driven, that blocks or opens the path of cylinder exhaust gasses to a turbine. The top of the moveable plug, along with the opposite shaped wall of the housing forms a variable supersonic nozzle, and the skirt of the plug rides against shaped runners that can be shaped to produce a programmed angularity of the top of the valve plug as the valve plug moves to open. This allows for shaping the contour of the runners to give a variable nozzle configuration required by gas dynamics to fully utilize the energy in the exhausting cylinder gas by producing the maximum velocity exhaust flow to the turbine throughout the blowdown process. The shortest path with the minimum restriction for the exhaust gas in the flow path leading to drive the turbine blades is desirable as shown in the drawings. Suggested layouts to accomplish this are included in Zinsmeyer's patent U.S. Pat. No. 4,535,592. A more detailed explanation of the variable nozzle of this invention is included in the detailed description of the drawings.

DETAILED DESCRIPTION OF THE INVENTION

Figure 1:
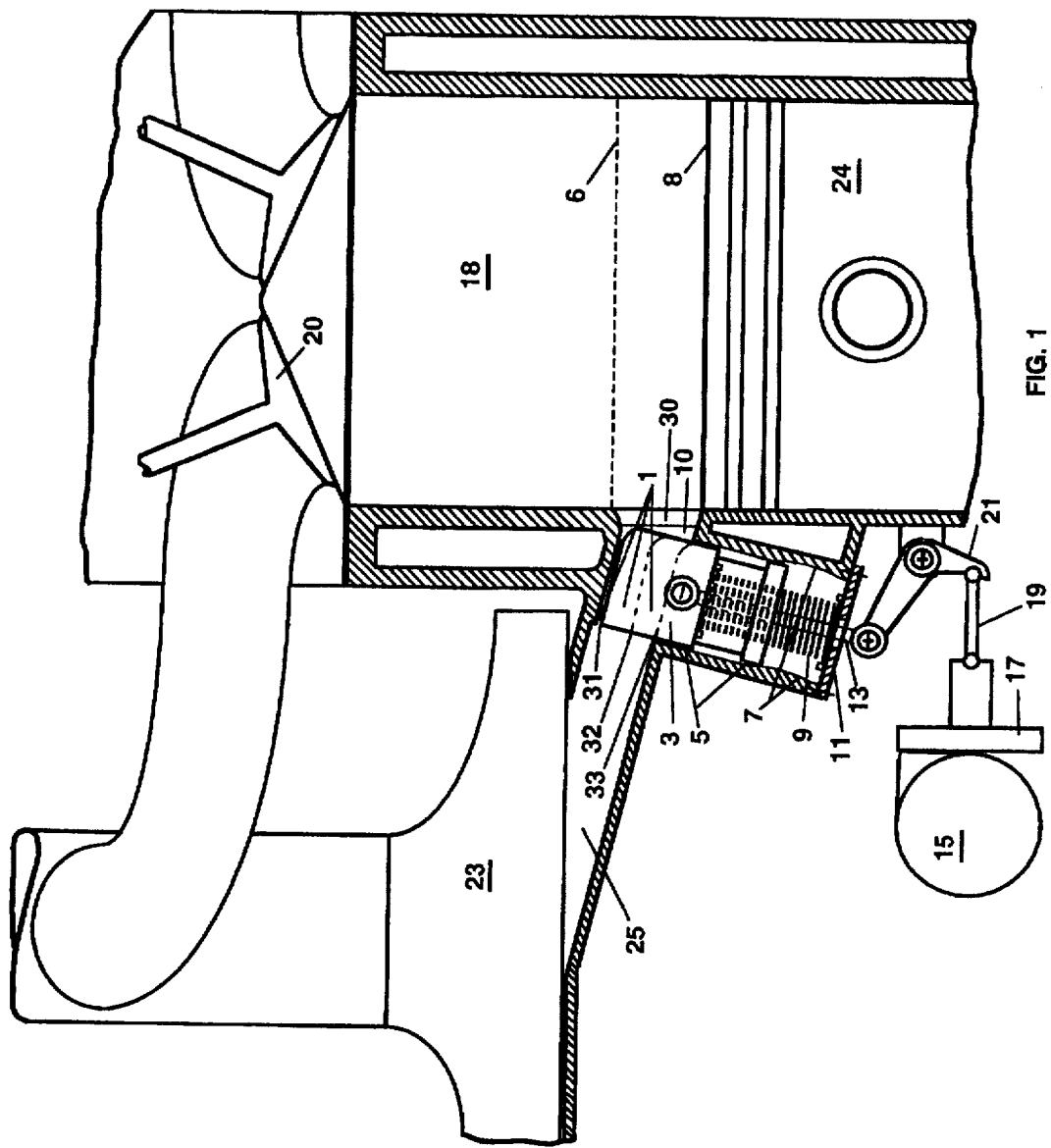
In FIG. 1 we show details of the variable geometry nozzle valve, and its operation and location relative to the engine cylinder in a cylinder side mount.

The invention may best be described from the drawings. In FIG. 1 we show a cut-away view of the invention indicating location relative to the internal combustion engine cylinder 18 and details of operation. We see plug valve 3 in a housing position 31 at a point where the valve is just starting to open as the top of piston 24 reaches position 6 and openings 30 in cylinder wall 18 are starting to be uncovered to feed high pressure gas into chamber 10. At this point variable geometry nozzle 1 is closed or only slightly open and the skirt of the plug valve 3 that is riding on bearings 5 is starting to cause the face of the plug to tilt as the skirt enters a depression in runners 7. The runners may be shaped and located to vary the outlet flow area of the nozzle which is formed by the upper face of plug 3 and the upper wall of duct 25 as the throat area of the nozzle inlet opens as plug 3 is pulled downward. In any intermediate position 32 the face of the plug is tilted by the runners positioning the lower skirt of plug 3 to the degree necessary to produce the correct exit-to-throat area ratio. That required ratio is as discussed earlier. At the valve plug position 33 the top of piston 24 is roughly at point 8 and the escaping exhaust gas velocity would typically have become sonic or less where the required nozzle throat to exit area ratio should be 1 to 1. We've described the valve action and formation of the variable geometry nozzle in some detail to show that the runners guiding the valve could be shaped to always give the optimum configuration for the nozzle to convert maximum energy to kinetic (velocity) energy from the gas, which is recoverable by the turbine as shaft power.

Plug 3 with the attached skirt is biased upward by valve spring 9 on foot plate 11. Pull rod 13 pulls the plug 3 downward by action of rocker arm 21. Rocker arm 21 is activated by the engine driven cam 15 through cam follower 17 and push rod 19.

When the nozzle valve is installed at the side of the cylinder as shown here on a four-stroke cycle engine, a conventional poppet type exhaust valve 20 must be placed and timed to open after the blowdown and remain open as piston 24 moves upward past openings 30 to allow all of the remaining gas to be swept out of the cylinder. Exhaust valve 20 is not needed if the nozzle valve is placed at the top of the cylinder, nor when the engine is a two-stroke cycle type.

Figure 2:
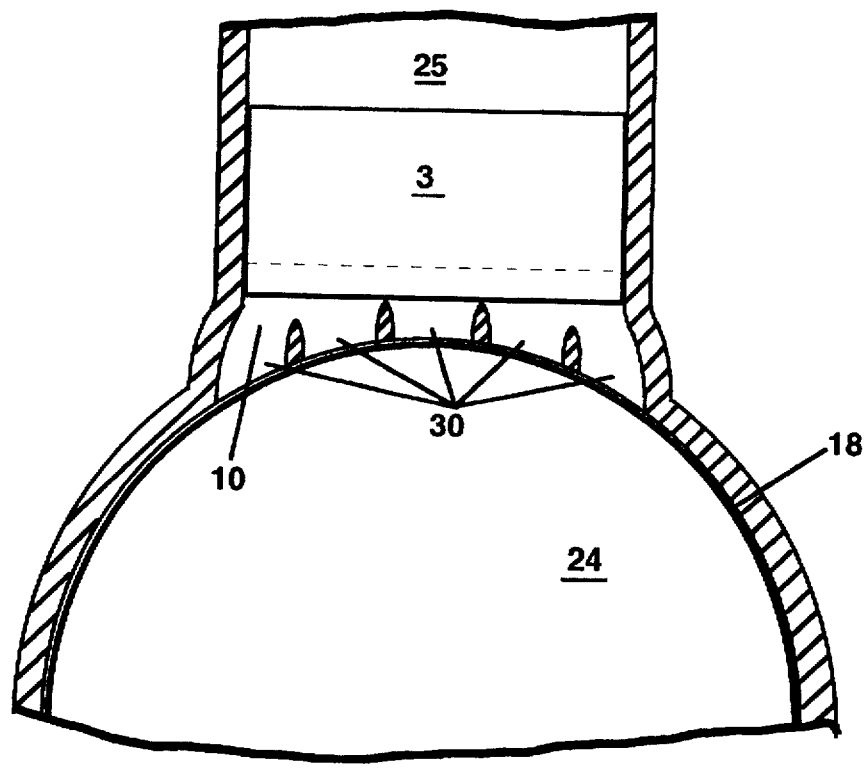
In FIG. 2 we show a top view indicating openings (exhaust ports) in the cylinder wall and chamber ahead of the nozzle valve.

In FIG. 2 we show a top view indicating multiple openings 30 through the wall of the engine cylinder to allow the exhaust gas to feed into chamber 10. Chamber 10 is small and gas flow through openings 30 will be at less than sonic velocity except for the very brief period of initially pressurizing chamber 10. Partitions between the openings support and retain the piston rings in place while spanning across the openings. Plug 3 is generally rectangular in shape with a rounded leading edge as shown in FIG. 1. Duct 25 leads to the turbine to drive the turbine with the nozzle-accelerated exhaust gas.

Figure 3:
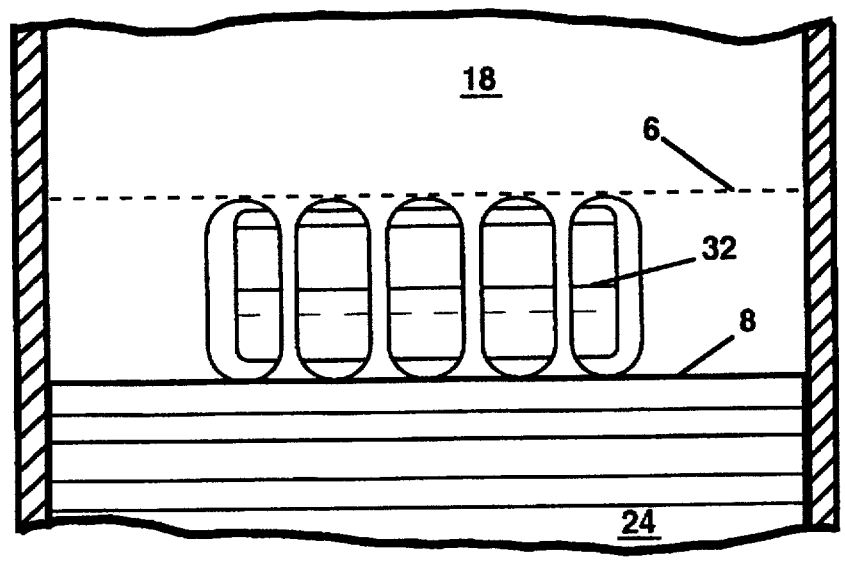
In FIG. 3 we show a view of the openings from inside the cylinder, and the entrance end of the valve plug in an intermediate position of opening.

In FIG. 3 we have shown an inside view of the wall of the engine cylinder 18 showing multiple openings 30. The top of the openings 30 is about at the point 6 where the top of piston 24 will be at about 110 degrees off top dead center where exhaust valves are usually timed to begin opening. The bottom of openings 30 is at point 8 where the piston 24 will be at bottom dead center.

We realize that many minor modifications could be made by one of normal skill in the art and wish to be limited only to the general parameters as outlined in these claims and specifications rather than exact details.

What is claimed is:

1. A combination exhaust valve and a variable geometry nozzle for each cylinder of a turbo compound engine comprising:

a) a housing adjacent to said cylinder, b) multiple openings in said cylinder communicating with said housing, c) a flow channel leading through a top portion of said housing from said multiple openings to a turbine inlet, d) a cam driven shaped plug means with a skirt in said housing, said cam driven plug means acting as a valve in an extended position to block flow in said flow channel and being shaped on an outer end to form a nozzle with a smooth variable opening throat with an opposite surface of said flow channel as said plug moves downward, e) guide runner means for said skirt in said housing, said guide runner means being shaped to produce a programmed variable tipping action as said plug moves downward to open said throat of said nozzle thereby producing an exit section with a variable exit area relative to said throat area of said nozzle downstream of said throat.

2. A combination exhaust valve and a variable geometry nozzle for each cylinder of a turbo compound engine as in claim 1 further comprising poppet type exhaust valves in a top head of said cylinder.

3. A combination exhaust valve and a variable geometry nozzle for each cylinder of a turbo compound engine as in claim 1 wherein said cam driven plug is driven and timed with crankshaft rotation.

4. A combination exhaust valve and a variable geometry nozzle for each cylinder of a turbo compound engine comprising a) a housing adjacent to said each cylinder, b) openings in said cylinders above the top of a piston at a point where said piston reaches a lowest point in said piston travel in said cylinders, said openings communicating with said housing, c) a flow channel leading from said openings through said housing and through a minimum resistance flow line to an inlet of a turbine, said turbine being connected to add power to an output shaft of said engine, d) a cam driven plug means in said housing, said cam driven plug means being extendable to close an inlet end of said flow channel, e) a guide means in said housing means to vary the angle of a face of said plug means to form a variable geometry nozzle to prevent loss of available energy in cylinder exhaust gas from said cylinder due to throttling in said flow channels as said plug means is pulled downward to allow said exhaust gas to flow to said turbine inlet.

* * * * *